(12) United States Patent
Krishnan et al.

(10) Patent No.: US 8,977,197 B2
(45) Date of Patent: Mar. 10, 2015

(54) CIRCUIT TUNING FOR DEVICE DETECTION IN NEAR-FIELD COMMUNICATIONS

(71) Applicant: QUALCOMM Incorporated, San Diego, CA (US)

(72) Inventors: Koushik Krishnan, San Jose, CA (US); Rainer Gaethke, San Francisco, CA (US); Faramarz Sabouri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 13/649,801

(22) Filed: Oct. 11, 2012

(65) Prior Publication Data
US 2014/0106668 A1 Apr. 17, 2014

(51) Int. Cl.
*H04B 5/00* (2006.01)
*H04B 7/00* (2006.01)
*G06K 7/00* (2006.01)
*G06K 7/10* (2006.01)

(52) U.S. Cl.
CPC .......... *G06K 7/0008* (2013.01); *G06K 7/10128* (2013.01); *H04B 5/0031* (2013.01); *H04B 5/0075* (2013.01); *H04B 17/12* (2013.01)
USPC ....................................... 455/41.1; 455/41.2

(58) Field of Classification Search
CPC .......... G06K 19/0723; G06K 19/0701; G06K 19/0715; G06K 7/10128; G06K 19/0726; G06K 19/07773; G06K 7/10386; H04B 5/0075; H04B 5/0012; H04B 5/0031; H04B 1/0458; H04B 5/00; H04L 63/0492; H04M 2250/04

USPC ................ 455/41.1, 41.2, 41.3, 73; 310/10.1; 340/10.1
See application file for complete search history.

(56) References Cited

U.S. PATENT DOCUMENTS

| 6,476,708 | B1 | 11/2002 | Johnson |
| 7,598,872 | B2 | 10/2009 | Plüss et al. |
| 8,116,683 | B2 | 2/2012 | Baarman |
| 8,446,046 | B2 * | 5/2013 | Fells et al. ................... 307/104 |
| 2009/0102607 | A1 | 4/2009 | Mejia et al. |
| 2009/0102663 | A1 | 4/2009 | Hillegass |

(Continued)

FOREIGN PATENT DOCUMENTS

| EP | 1770665 A1 | 4/2007 |
| EP | 2077518 A1 | 7/2009 |

(Continued)

OTHER PUBLICATIONS

Partial International Search Report—PCT/US2013/060336—ISA/EPO—Jan. 20, 2014.

(Continued)

*Primary Examiner* — Lewis West
(74) *Attorney, Agent, or Firm* — Mahamedi Paradice LLP (57) ABSTRACT

A near-field communications (NFC) device includes an NFC antenna, a matching network coupled to the NFC antenna, and a transmitter coupled to the matching network. The transmitter applies a signal to the matching network and a capacitance of the matching network is varied. A parameter is measured while varying the capacitance of the matching network and while applying the signal. A peak value of the parameter is identified and compared to a threshold. A communication protocol is initiated in response to a determination that the peak value satisfies the threshold.

21 Claims, 9 Drawing Sheets

(56) References Cited

U.S. PATENT DOCUMENTS

| | | |
|---|---|---|
| 2010/0084918 A1* | 4/2010 | Fells et al. .................. 307/32 |
| 2010/0144269 A1 | 6/2010 | Do et al. |
| 2010/0148723 A1 | 6/2010 | Cook et al. |
| 2010/0321164 A1 | 12/2010 | Wuidart |
| 2011/0043429 A1 | 2/2011 | Merlin |
| 2011/0080051 A1 | 4/2011 | Lee et al. |
| 2012/0043827 A1 | 2/2012 | Baarman |
| 2012/0214411 A1* | 8/2012 | Levy ........................ 455/41.1 |
| 2013/0112747 A1* | 5/2013 | McFarthing ................ 235/439 |
| 2014/0106669 A1 | 4/2014 | Krishnan et al. |

FOREIGN PATENT DOCUMENTS

| | | |
|---|---|---|
| EP | 2107495 A2 | 10/2009 |
| EP | 2148289 A1 | 1/2010 |
| GB | 2443234 A | 4/2008 |

OTHER PUBLICATIONS

International Search Report and Written Opinion—PCT/US2013/060336—ISA/EPO—Jun. 6, 2014.

* cited by examiner

CIRCUIT TUNING FOR DEVICE DETECTION IN NEAR-FIELD COMMUNICATIONS

TECHNICAL FIELD

The present embodiments relate generally to near-field communications (NFC), and specifically to detecting the presence of an NFC device.

BACKGROUND OF RELATED ART

NFC technology allows for communications between a mobile device (e.g., an NFC-enabled mobile phone or a smart card with an NFC/RFID tag) and an NFC reader (e.g., in a point-of-sale terminal or another mobile device) over a distance of several centimeters or less. To initiate communications, an NFC device first recognizes that another NFC device is within range. Traditional techniques that involve periodic polling consume excessive amounts of power and may be too elaborate to be performed frequently. Accordingly, there is a need for efficient techniques for an NFC device to detect the presence of another NFC device.

BRIEF DESCRIPTION OF THE DRAWINGS

The present embodiments are illustrated by way of example and are not intended to be limited by the figures of the accompanying drawings.

Like reference numerals refer to corresponding parts throughout the drawings and specification.

DETAILED DESCRIPTION

Embodiments are disclosed in which a resonant circuit in a near-field communications (NFC) device is tuned and a determination as to whether another NFC device is within range for near-field communications is made based on a result of the tuning.

In some embodiments, a method of operating an NFC device that includes an NFC antenna, a matching network coupled to the NFC antenna, and a transmitter coupled to the matching network is performed. A signal is applied from the transmitter to the matching network and a capacitance of the matching network is varied. A parameter is measured while varying the capacitance of the matching network and while applying the signal. A peak value of the parameter is identified and compared to a threshold. A communication protocol is initiated in response to a determination that the peak value satisfies the threshold.

In some embodiments, an NFC device includes an NFC antenna; a matching network coupled to the NFC antenna and having a variable capacitance; and a transmitter, coupled to the matching network, to provide a signal to the matching network. The NFC device also includes one or more processors and memory storing one or more programs configured to be executed by the one or more processors. The one or more programs include instructions to vary the capacitance of the matching network; instructions to measure a parameter while varying the capacitance of the matching network and while the transmitter provides the signal to the matching network; instructions to identify a peak value of the parameter; instructions to compare the peak value to a threshold; and instructions to initiate a communication protocol in response to a determination that the peak value satisfies the threshold.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

Figure 1:
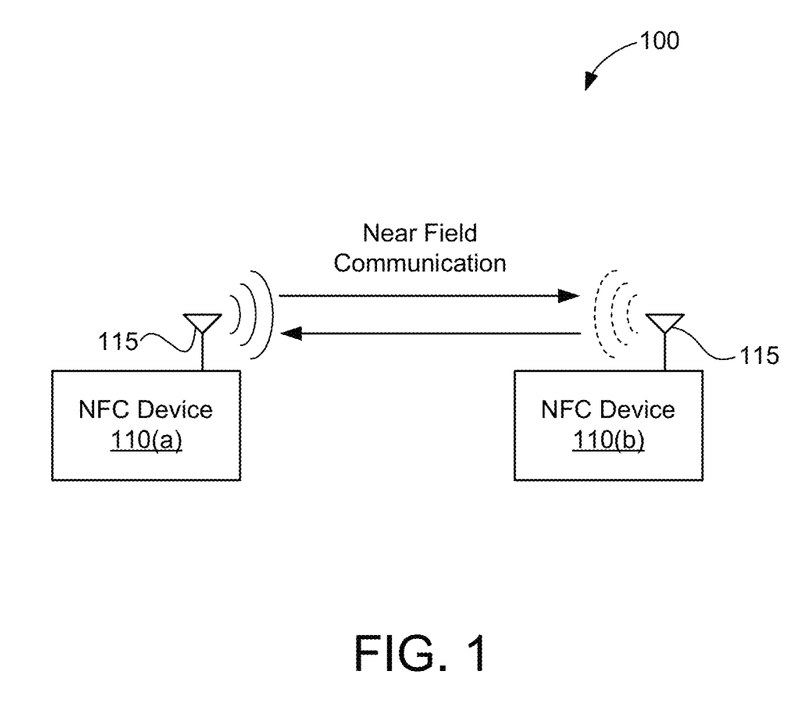
FIG. 1 is a block diagram of an NFC system that includes two NFC-enabled communication devices in accordance with some embodiments.

FIG. 1 shows an NFC system 100 that includes two NFC-enabled communication devices 110(a) and 110(b) in accordance with some embodiments. NFC devices 110(a) and 110(b) are each equipped with an NFC antenna 115 capable of exchanging wireless communication signals in the near field with other NFC antennas in other NFC devices. When the antennas 115 of the NFC devices 110(a) and 110(b) are brought near to each other (e.g., within a few centimeters of each other—for example, within four centimeters of each other), they become inductively coupled; once inductively coupled, they allow the NFC devices 110(a) and 110(b) to perform near-field communication with each other. This inductive coupling may be measured using the well-known inductive coupling K-factor; the two antennas 115 are considered to be inductively coupled to a degree sufficient for near-field communication if K satisfies a threshold (e.g., if K is at least 0.05). In some embodiments, the antennas 115 are loop antennas that allow for radio frequency (RF) transmission and reception, although other well-known antennas can be used. In some embodiments, near-field communication between the NFC devices 110(a) and 110(b) is performed in accordance with one or more standards (e.g., ISO/IEC 18092, ECMA-340, and/or standards defined by the NFC Forum).

In some embodiments, both NFC devices 110(a) and 110(b) are mobile electronic devices (e.g., cellular phones, personal digital assistants, or other mobile devices). In other embodiments, the NFC device 110(a) is a mobile device and the NFC device 110(b) is an NFC tag (e.g., a passive radio-frequency identification (RFID) tag). In still other embodiments, the NFC device 110(a) is an NFC reader situated, for example, in a kiosk or admissions gate, and the NFC device 110(b) is a mobile device or NFC tag. In some embodiments, the NFC device 110(a) is a proximity coupling device (PCD) and the NFC device 110(b) is a proximity integrated circuit card (PICC) (e.g., a contactless smart card).

Figure 2:
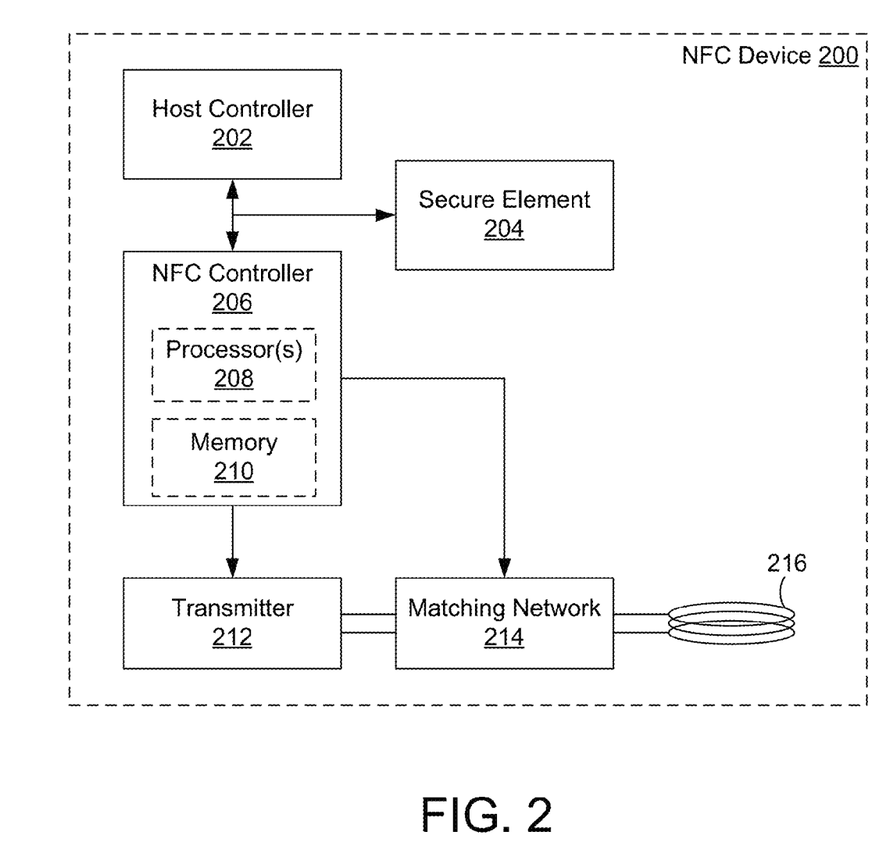
FIG. 2 is a block diagram of an NFC device in accordance with some embodiments.

FIG. 2 is a block diagram of an NFC device 200 in accordance with some embodiments. The NFC device 200 is an example of a mobile device 110(a) or 110(b) (FIG. 1), such as an NFC-enabled mobile device or NFC reader. In some embodiments, the NFC device 200 is an example of a PCD.

The NFC device 200 has an NFC controller 206, which includes one or more processors (or processor cores) 208 and memory 210. The memory 210 includes instructions that, when executed by the one or more processors 208, cause the NFC controller 206 to implement an NFC protocol (e.g., as specified in standards such as ISO/IEC 18092, ECMA-340, and/or standards defined by the NFC Forum). In some embodiments, these instructions are stored in a non-transitory computer-readable medium (e.g., one or more non-volatile memory devices) in the memory 210. The NFC controller 206 is coupled to and controls a transmitter 212, which in turn is coupled to an NFC antenna 216 (shown in FIG. 2 as a loop antenna that acts as an inductor) through a matching network 214. The antenna 216 is an example of an antenna 115 (FIG. 1). During communication with another NFC device, the NFC controller 206 provides data to the transmitter 212, which encodes the data and provides a corresponding signal to the matching network 214 and antenna 216. In some embodiments, this signal includes a carrier signal with a radio-frequency (RF) carrier frequency. In one example, the carrier frequency is 13.56 MHz.

The NFC controller 206 is also coupled to the matching network 214 and provides control signals to the matching network 214 to tune the matching network 214. For example, a capacitance of the matching network 214 may be varied based on a control signal from the NFC controller 206. The matching network 214 and antenna 216 compose a resonant circuit, which is sometimes referred to as a tank circuit. The tank circuit may be resonated by applying a signal (e.g., an oscillating signal) to it from the transmitter 212. By tuning the matching network 214, the resonance frequency and/or resonance quality factor (i.e., the well-known Q-factor) of the tank circuit may be varied.

The NFC device 200 may also include a host controller 202 to execute one or more applications, which may involve near-field communications. The NFC device 200 may further include a secure element 204 to store NFC data. In additional, the NFC device 200 may include other components not shown in FIG. 2. For example, the NFC device 200 may include one or more other antennas (e.g., for cellular communications or communications using a wireless local area network such as WiFi).

The NFC device 200 may perform an NFC polling procedure to initiate communication with another NFC device. For example, the NFC device 200 may periodically poll for another NFC device; if it receives a response to its polling, it proceeds to communicate with the other device. This periodic polling, however, consumes power and thus is not desirable. To avoid periodic polling, the NFC device 200 may periodically tune its matching network 214 and monitor one or more parameters (e.g., current, voltage, and/or power) associated with the matching network 214 and/or the antenna 216 while the matching network 214 and antenna 216 are resonated. Based on the one or more parameters, a determination is made as to whether another NFC device is within communications range. If another NFC device is determined to be within range, the NFC device 200 initiates communication (e.g., by performing polling, receiving a response, and then transmitting data.) This process exploits the fact that inductive coupling of an external NFC device's antenna 115 (FIG. 1) to the antenna 216 of the device 200 reduces the Q-factor of the tank circuit formed by the matching network 214 and antenna 216 and/or changes the resonant frequency of the tank circuit, and thus changes the current consumed by the tank circuit while being resonated and the voltage across the antenna 216. Reduction of the tank circuit's Q-factor may either increase or decrease the consumed current, depending on the design of the matching network 214.

Figure 3A:
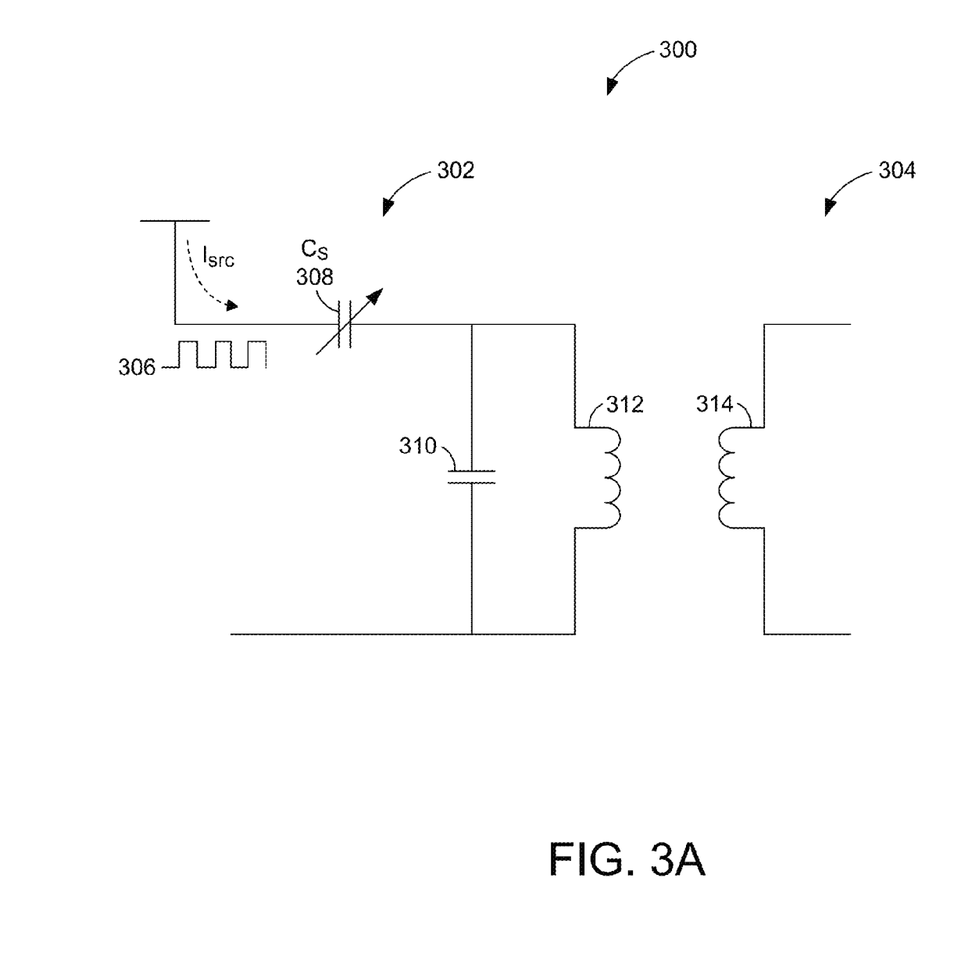
FIGS. 3A and 3B are circuit diagrams of systems in which the NFC antennas of two NFC devices are inductively coupled in accordance with some embodiments.

FIG. 3A is a circuit diagram of a system 300 in which two NFC devices 302 and 304 are situated such that their NFC antennas are inductively coupled in accordance with some embodiments. The devices 302 and 304 are examples of the devices 110(a) and 110(b) (FIG. 1); the device 302 may also be an example of the device 200 (FIG. 2). The antenna of the device 302, which is an example of the antenna 216 (FIG. 2), includes an inductor 312 and a capacitor 310. The capacitor 310 may represent a parasitic capacitance of the antenna as opposed to being a discrete element of the antenna. (The antenna of the device 302 also has a parasitic resistance, which is not shown for simplicity.) The matching network of the device 302, which is an example of the matching network 214 (FIG. 2), includes a variable capacitor 308 in series with the inductor 312. The capacitance of the variable capacitor 308 may be varied in response to control signals from an NFC controller (e.g., controller 206, FIG. 2). The antenna of the device 304 includes an inductor 314.

The inductor 312 and capacitors 308 and 310 form a resonant tank circuit. To detect whether the device 304 is present, an oscillating signal 306 is provided to the variable capacitor 308 (e.g., from a transmitter 212, FIG. 2) to resonate the tank circuit. In some embodiments, the signal 306 is an RF carrier signal. The capacitance of the variable capacitor 308 is varied across a range of values; for each value, the current $I_{src}$ consumed by the tank circuit (and thus by the matching network and antenna) is monitored. A peak value of the current $I_{src}$ is identified and compared to a threshold that corresponds to a particular value of the inductive coupling K-factor. If the peak value of the current $I_{src}$ satisfies the threshold, a determination is made that the inductor 314 is coupled to the inductor 312 (e.g., K is greater than, or greater than or equal to, a predefined value, for example, 0.05) and thus that the device 304 is present. In some implementations (e.g., in FIGS. 3A, 3B, and 5 below), the peak value of the current $I_{src}$ satisfies the threshold if it is less than, or less than or equal to, the threshold. In other implementations (e.g., in FIG. 6 below) the peak value of the current $I_{src}$ satisfies the threshold if it is greater than, or greater than or equal to, the threshold. Alternatively, or in addition, the voltage across the inductor 312 is monitored and compared to a threshold to determine whether the device 304 is present. In some embodiments, this detection process is performed periodically (e.g., every millisecond, or with a period between one and 10 milliseconds, or with a period between 10 and 50 milliseconds or more).

Figure 3B:
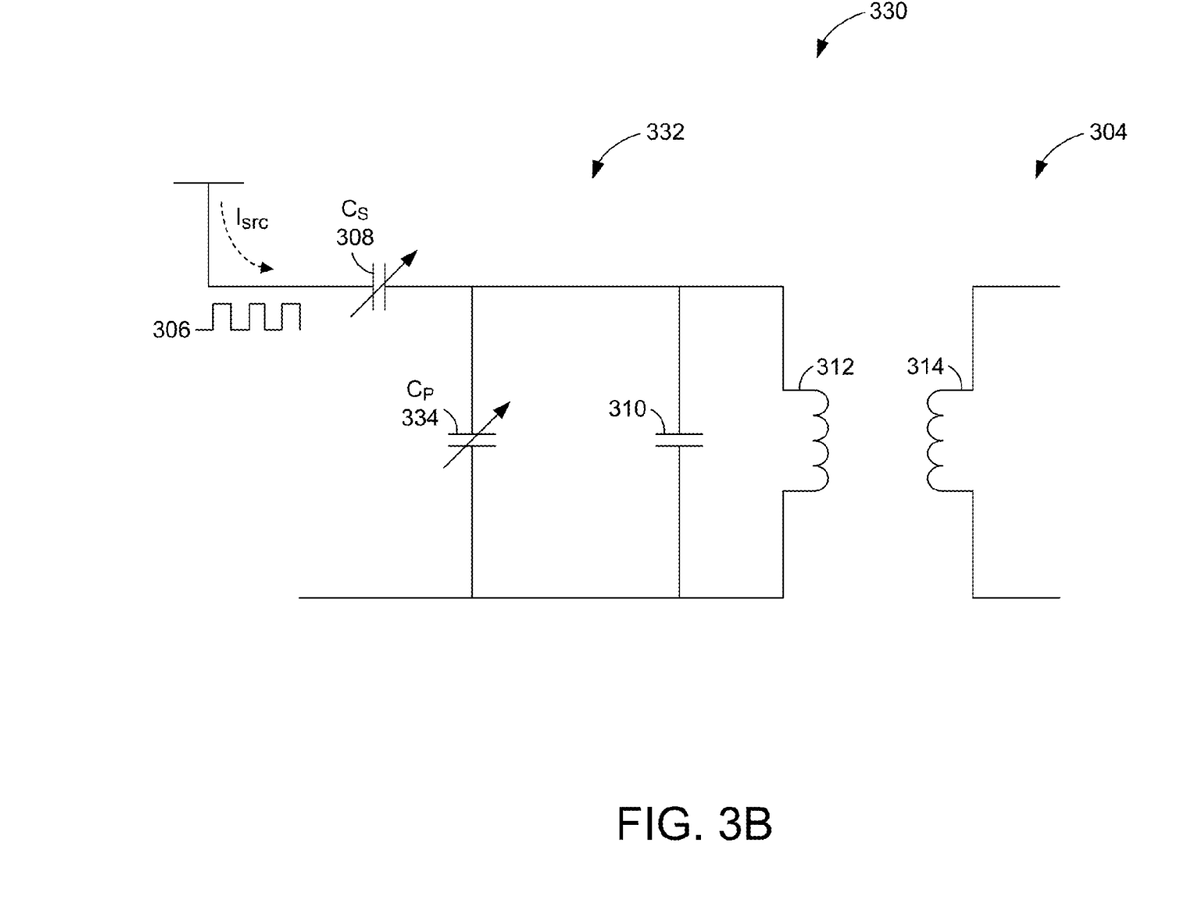

In some embodiments, a matching network (e.g., matching network 214, FIG. 2) includes a variable capacitor 334 situated in parallel with the inductor 312 in addition to the variable capacitor 308 situated in series with the inductor 312, as illustrated in FIG. 3B in accordance with some embodiments. The system 330 of FIG. 3B is identical to the system 300 of FIG. 3A, except that the device 302 (FIG. 3A) is replaced with a device 332 in which the matching network includes the variable capacitor 334 as well as the variable capacitor 308. The variable capacitor 308 is referred to as $C_s$, indicating that it is in series with the antenna, and the variable capacitor 334 is referred to as $C_p$, indicating that it is in parallel with the antenna; the resulting configuration of the matching network in the device 332 is referred to as a $C_s$-$C_p$ configuration. To detect whether the device 304 is present, the oscillating signal 306 is provided to resonate the tank circuit formed by the inductor 312 and capacitors 308, 310, and 334. The capacitance of the variable capacitor 308, the variable capacitor 334, or both variable capacitors 308 and 334 is varied across a range of values; for each value, the current $I_{src}$ consumed by the tank circuit and/or the voltage across the inductor 312 is monitored. A peak value of the current $I_{src}$ and/or the voltage across the inductor 312 is identified and compared to the threshold(s) to determine whether the device 304 is present, as described with respect to FIG. 3A.

Figure 4:
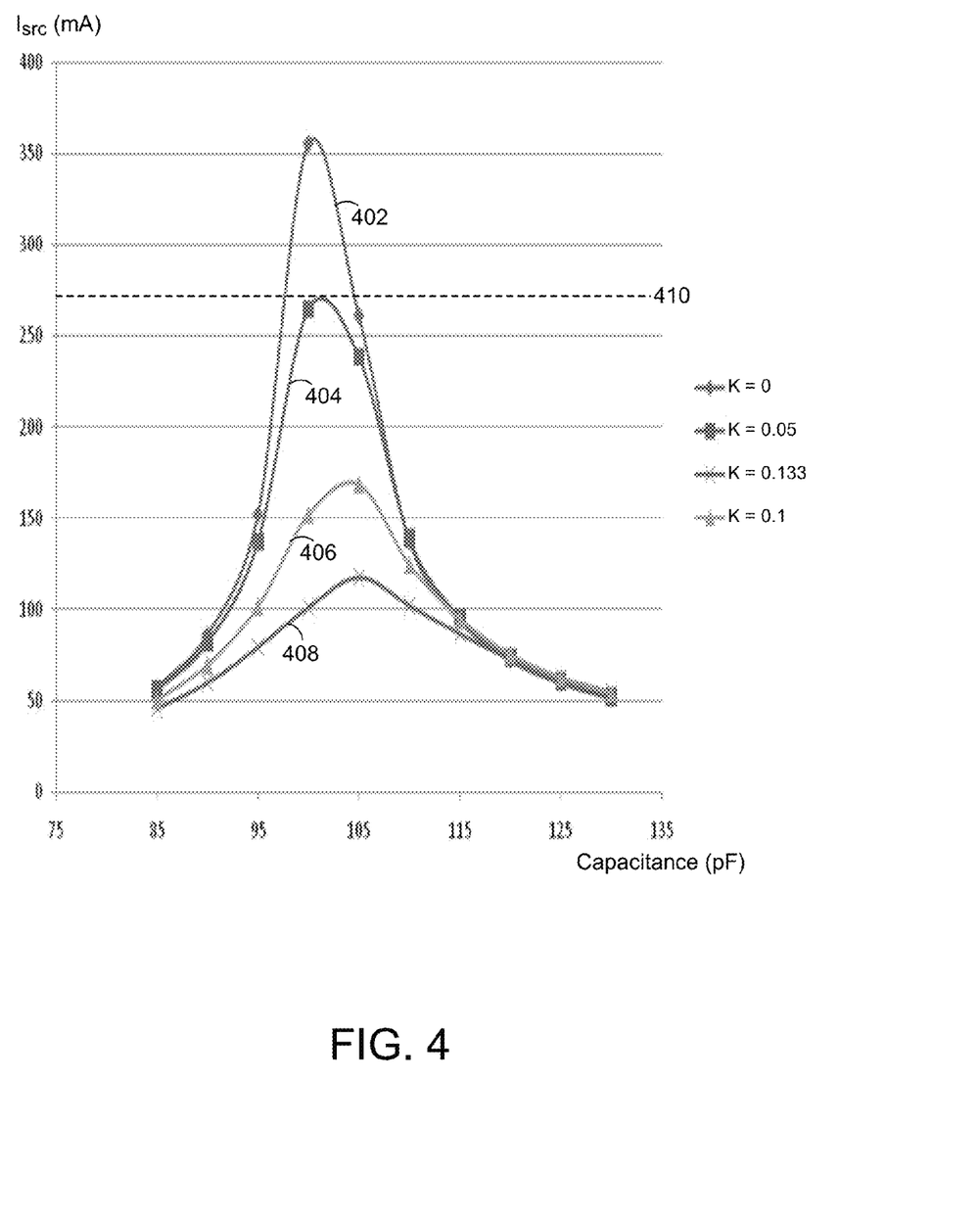
FIG. 4 is a graph showing a prophetic example of the variation of current versus capacitance for an NFC antenna and matching network for varying degrees of inductive coupling in accordance with some embodiments.

FIG. 4 is a graph showing a prophetic example of how $I_{src}$ varies with the capacitance of the variable capacitor 308 for increasing degrees of inductive coupling in accordance with some embodiments. (Similar graphs may be generated by varying the capacitance of a matching network in other manners, as described, for example, with respect to FIGS. 3B, 5, and 6.) The capacitance of the variable capacitor 308 is swept across a range of values (e.g., is incremented through a series of discreet values within the range) from 85 picofarads (pF) to 130 pF. A first curve 402 shows the resulting values of $I_{src}$ with no inductive coupling (K=0) between the inductors 312 and 314 (FIGS. 3A-3B). A second curve 404 shows the resulting values of $I_{src}$ for slight inductive coupling (K=0.05), a third curve 406 shows $I_{src}$ for stronger inductive coupling (K=0.1), and a fourth curve 408 shows $I_{src}$ for even stronger inductive coupling (K=0.133). The second $I_{src}$ curve 404 peaks when the capacitance is approximately 100 pF. Based on this peak value of $I_{src}$, a threshold 410 is established. Peak $I_{src}$ values may be compared to the threshold 410 to determine whether an NFC device (e.g., device 304, FIG. 3) is within range for near-field communications.

As shown in FIG. 4, the value of the variable capacitance that produces the $I_{src}$ peak increases as the inductive coupling increases. A capacitance threshold may be established that is used along with (or instead of) the threshold 410 to determine whether an NFC device is within range for near-field communications. Furthermore, graphs similar to the graph of FIG. 4 may be generated showing a resonant voltage or power versus capacitance, instead of the resonant current $I_{src}$ versus capacitance, and corresponding thresholds may be established.

Figure 5:
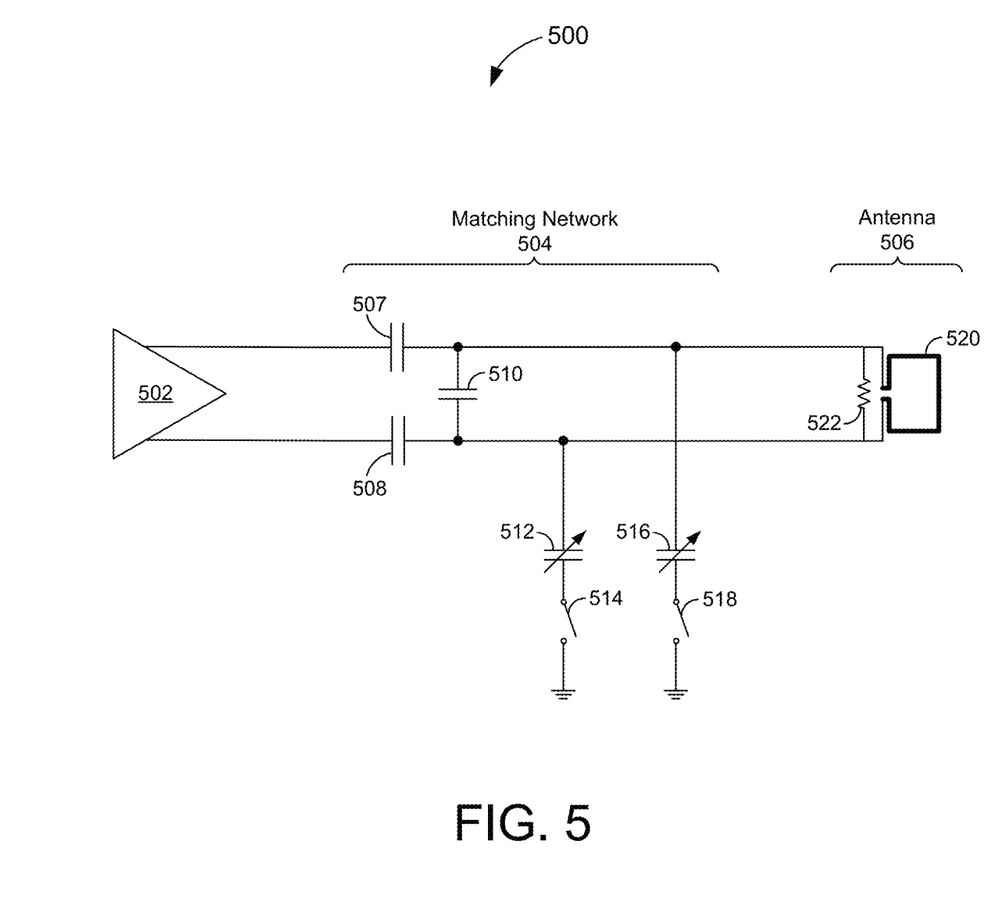
FIG. 5 is a circuit diagram showing an NFC device with a matching network that includes switched capacitors in accordance with some embodiments.

FIG. 5 is a circuit diagram showing an NFC device 500 that is another example of an NFC device 200 (FIG. 2) in accordance with some embodiments. An amplifier 502 in a transmitter (e.g., transmitter 212, FIG. 2) is coupled to an antenna 506 through a matching network 504. The matching network 504 and antenna 506 are respective examples of the matching network 214 and antenna 216 (FIG. 2). The antenna 506 includes an inductive loop 520 and an associated resistor 522. The matching network 504 includes a capacitor 507 coupled to a first output node of the amplifier 502 and a capacitor 508 coupled to a second output node of the amplifier 508. The capacitors 507 and 508 are situated in series with the antenna 506, with one on each side of the antenna 506. The matching network 504 also includes a capacitor 510 coupled to respective terminals of the capacitors 507 and 508 and situated in parallel with the antenna 506.

The matching network 504 further includes a plurality of capacitors 512 and 516 that may be selectively coupled to ground through respective switches 514 and 518. The capacitor 512 is selectively coupled between a first terminal of the capacitor 510 and ground, while the capacitor 516 is selectively coupled between a second terminal of the capacitor 510 and ground. The switches 514 and 518 are controlled, for example, by control signals from the NFC controller 206 (FIG. 2). In some embodiments, the capacitors 512 and 516 are variable capacitors, and the capacitance of the matching network 504 may be varied by opening and closing the switches 514 and 518 to selectively couple the capacitors 512 and 516 to ground and/or by varying the values of the capacitors 512 and 516. Alternatively, the values of the capacitors 512 and 516 are fixed and the capacitance of the matching network 504 may be varied by opening and closing the switches 514 and 518 to selectively couple the capacitors 512 and 516 to ground. Closing and opening the switches 514 and 518 has the effect of switching the capacitors 512 and 516 into or out of the matching network 504.

Figure 6:
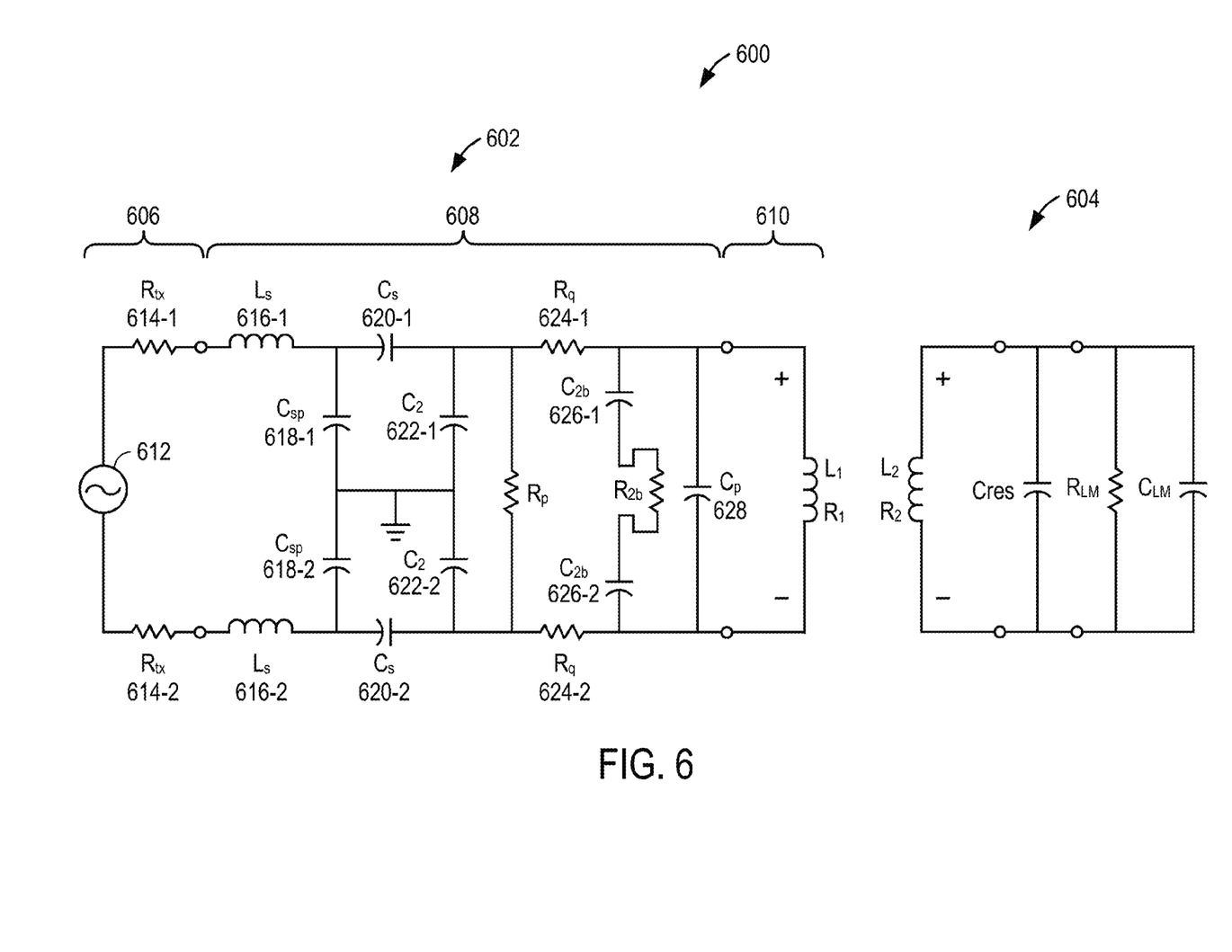
FIG. 6 is a circuit diagram of a system in which the NFC antennas of two NFC devices are inductively coupled in accordance with some embodiments.

FIG. 6 is a circuit diagram of a system 600 in which two NFC devices 602 and 604 are situated such that their NFC antennas are inductively coupled in accordance with some embodiments. The NFC device 602 is yet another example of an NFC device 200 (FIG. 2); also, the devices 602 and 604 are respective examples of the devices 110(a) and 110(b) (FIG. 1).

The NFC device 602 includes a transmitter 606, matching network 608, and antenna 610 that are respective examples of the transmitter 212, matching network 214, and antenna 216 (FIG. 2). The transmitter 606 includes an oscillator 612 that provides an oscillating signal (e.g., an RF carrier signal such as the signal 306, FIGS. 3A-3B). The transmitter 606 has an output impedance $R_{tx}$, as indicated by the resistors 614-1 and 614-2. In some embodiments, the output impedance $R_{tx}$ 614-1 and 614-2 is variable (e.g., may be varied by activating or de-activating parallel transistors in response to control signals from an NFC controller 206, FIG. 2). In some embodiments, the output impedance $R_{tx}$ 614-1 and 614-2 has a nominal value of 2.5 ohms during normal operation.

The transmitter 606 is coupled to the matching network 608. The matching network 608 includes inductors $L_s$ 616-1 and 616-2 and capacitors $C_{sp}$ 618-1 and 618-2 configured as a low-pass filter: each capacitor $C_{sp}$ 618-1 and 618-2 couples an output terminal of a corresponding inductor 616-1 and 616-2 to ground. This low-pass filter configuration filters electromagnetic interference (EMI) and is sometimes referred to as an EMI matching network configuration. The matching network 608 also includes a $C_s$-$C_p$ configuration: capacitors $C_s$ 620-1 and 620-2 are in series with the antenna 610 (and with respective resistors $R_q$ 624-1 and 624-2 in the matching network), while capacitor $C_p$ 628 is in parallel with the antenna 610. In some embodiments, the capacitors $C_s$ 620-1 and 620-2, $C_2$ 622-1 and 622-2, and/or $C_{2b}$ 626-1 and 626-2 are adjustable and may be varied to vary the overall capacitance of the matching network 608. The capacitor $C_p$ 628 may represent a parasitic capacitance.

Also in parallel with the antenna 610 is a stack of capacitors $C_{2b}$ 626-1 and 626-2 and a resistor $R_{2b}$. Furthermore, a capacitor $C_2$ 622-1 couples a node between capacitor $C_s$ 620-1 and resistor $R_q$ 624-1 to ground, and a capacitor $C_2$ 622-2 couples a node between capacitor $C_s$ 620-2 and resistor $R_q$ 624-2 to ground, thereby providing further low-pass filtering. An optional resistor $R_p$ couples these two nodes to each other.

The antenna 610 includes an inductor $L_1$ and has an associated antenna resistance $R_1$. In some embodiments, $L_1$ has a nominal value of 2.3 uH and $R_1$ has a nominal value of 1.1 ohms. Similarly, the NFC device 604 includes as an antenna an inductor $L_2$ with an associated antenna resistance R2. In parallel with the inductor $L_2$ is a capacitor $C_{res}$, a resistor $R_{LM}$, and a capacitor $C_{LM}$, which along with the inductor $L_2$ compose a tank circuit in the NFC device 604.

Figure 7A:
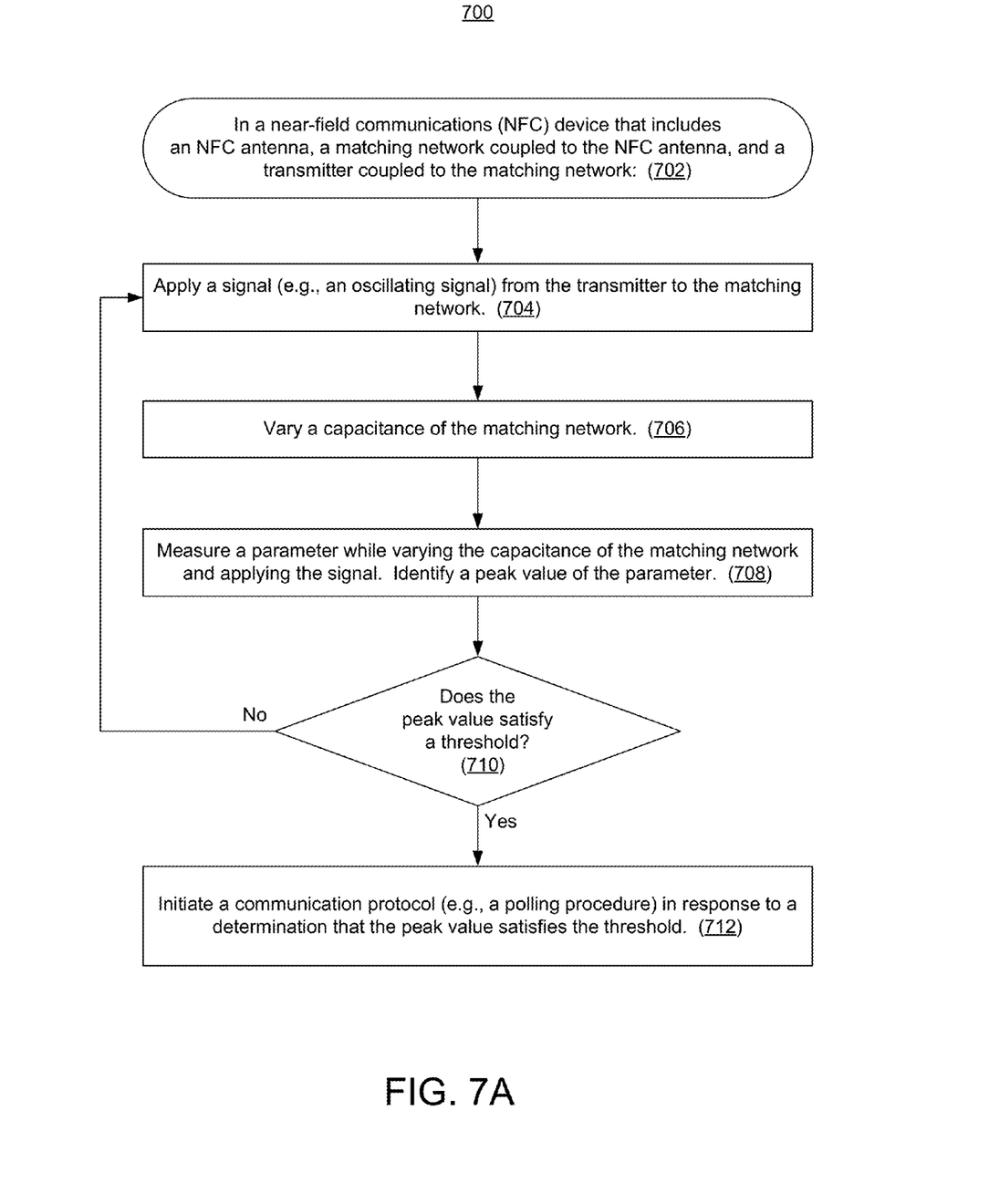
FIGS. 7A and 7B are flowcharts illustrating methods of operating an NFC device in accordance with some embodiments.

FIG. 7A is a flowchart illustrating a method 700 of operating an NFC device (e.g., the NFC device 200, FIG. 2, examples of which include the devices 302, FIG. 3A, 332, FIG. 3B, 500, FIGS. 5, and 602, FIG. 6) that includes (702) an NFC antenna (e.g., antenna 216, FIG. 2), a matching network (e.g., matching network 214, FIG. 2) coupled to the NFC antenna, and a transmitter (e.g., transmitter 212, FIG. 2) coupled to the matching network. In some embodiments, a non-transitory computer-readable medium (e.g., one or more non-volatile memory devices) in the memory 210 of the NFC controller 206 (FIG. 2) includes instructions that, when executed by the processor(s) 208, cause the NFC device 200 to perform the method 700.

In the method 700, a signal (e.g., the signal 306, FIGS. 3A-3B) is applied (704) from the transmitter to the matching network. In some embodiments, the signal is an oscillating RF carrier signal. A capacitance of the matching network is varied (706). For example, the capacitance is swept across a range of values (e.g., as illustrated in FIG. 4). In some embodiments, the varied capacitance is the capacitance of one or more variable capacitors in the matching network (e.g., $C_s$ 308, FIGS. 3A-3B, or 620-1 and/or 620-2, FIG. 6) (e.g., $C_p$ 334, FIG. 3B, or $C_2$ 622-1 and 622-2 and/or $C_{2b}$ 626-1 and 626-2). In some embodiments, the capacitance of the matching network is varied by selectively coupling one or more capacitors (e.g., capacitors 512 and/or 516, FIG. 5) to ground (e.g., using switches 514 and 518, FIG. 5).

A parameter (e.g., current, voltage, or power) is measured (708) while varying the capacitance of the matching network and applying the signal. For example, the current $I_{src}$ (FIGS. 3A-3B and 4) is measured. In another example, a voltage across the antenna 216 (FIG. 2) is measured. In some embodiments, multiple parameters (e.g., current and voltage) are measured. A peak value of each measured parameter is identified.

A determination is made (710) as to whether the peak value satisfies (e.g., is less than, or less than or equal to, or greater than, or greater than or equal to) a threshold (e.g., threshold 410, FIG. 4). (If multiple parameters are measured, the peak value of each one is compared to a respective threshold.) If the peak value (or each peak value) satisfies the threshold (710-Yes), a communication protocol (e.g., a polling procedure) is initiated (712) in response to the determination that the peak value satisfies the threshold.

If, however, the peak value (or each peak value) does not satisfy the threshold (710-No), the operations 704-710 are repeated. For example, the operations 704-710 are repeated after a specified period of time, such that the operations 704-710 are performed periodically in a bursty manner.

While the method 700 includes a number of operations that appear to occur in a specific order, it should be apparent that the method 700 can include more or fewer operations, which can be executed serially or in parallel. An order of two or more operations may be changed and two or more operations may be combined into a single operation.

The method 700 thus allows a communication protocol (including, for example, a polling procedure) to be initiated based on a parameter measurement, and avoids the need to perform periodic polling to determine whether another NFC device is within communications range. The method 700 thus saves power and extends battery life for battery-powered NFC devices that perform the method.

However, variations caused by manufacturing and/or operating conditions may cause the method 700 sometimes to provide inaccurate results. For example, the output impedance (e.g., $R_{tx}$ 614-1 and 614-2, FIG. 6) and/or antenna resistance (e.g., $R_1$, FIG. 6) may vary in accordance with manufacturing tolerances and/or operating conditions. As a result, an NFC device 200 (FIG. 2) performing the method 700 may sometimes fail to detect another NFC device that is inductively coupled to the antenna 216 and may sometimes falsely determine that another NFC device is inductively coupled to the antenna 216. These false results may be reduced or eliminating by calibrating the NFC device 200 (e.g., by calibrating the transmitter output impedance and/or the antenna resistance).

In some embodiments, the NFC device 200 is calibrated by successively configuring the output impedance $R_{tx}$ (e.g., $R_{tx}$ 614-1 and 614-2, FIG. 6) of the transmitter 212 (FIG. 2) to have two different values. The second value of $R_{tx}$ may be a known multiple or fraction of the first value of $R_{tx}$: $R_{tx2}=c*R_{tx1}$, where c is a known constant. For each value of $R_{tx}$, a signal (e.g., signal 306, FIGS. 3A-3B) is applied to the matching circuit 214 to resonate the tank circuit, and the capacitance of the matching circuit 214 is varied until one or more peak parameter values are detected. For each $I_{src}$ peak, for example, a corresponding resonance voltage $V_{res}$ is measured. (The capacitance that produced the $I_{src}$ peak may also be measured.) Because $I_{src}$ is a function of $R_{tx}$ and the antenna resistance $R_{ant}$ ($I_{src}=V_{dd}/(R_{tx}+R_{ant})$ at resonance, the result is two equations with two unknowns. Solving these equations provides the values of $R_{tx}$ and $R_{ant}$. ($R_1$ of FIG. 6 is an example of $R_{ant}$.) The $I_{src}$ threshold (e.g., threshold 410, FIG. 4) may then be determined based on the values of $R_{tx}$ and $R_{ant}$. For example, the memory 210 (FIG. 2) may include a look-up table to provide the threshold value as a function of the sum of $R_{tx}$ and $R_{ant}$. This use of two measurement sets, one for each of the two respective $R_{tx}$ values, allows variation in the values of $R_{tx}$ and $R_{ant}$ resulting from manufacturing and/or operating conditions to be calibrated out.

Figure 7B:
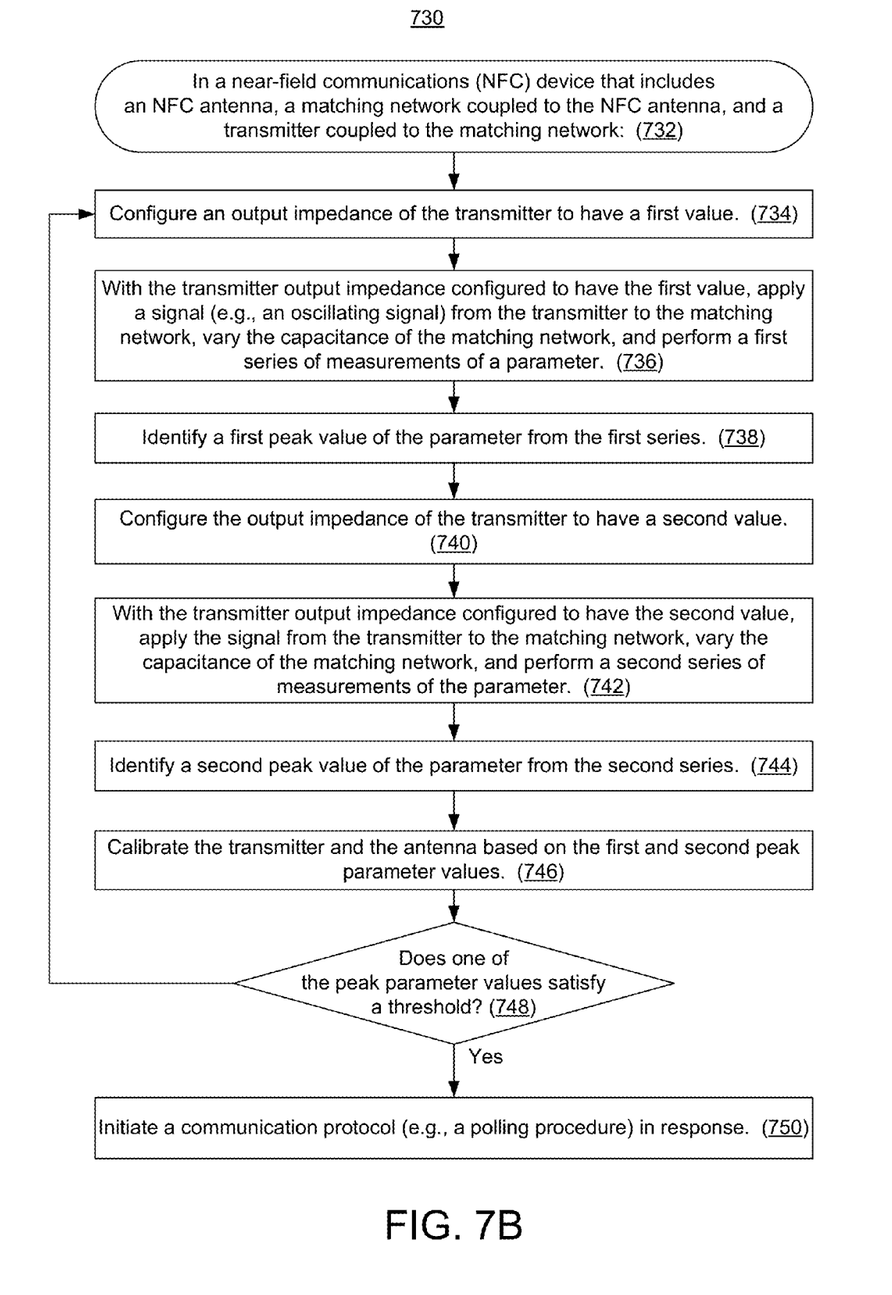

FIG. 7B is a flowchart illustrating a method 730 of operating an NFC device (e.g., the NFC device 200, FIG. 2, examples of which include the devices 302, FIG. 3A, 332, FIG. 3B, 500, FIGS. 5, and 602, FIG. 6) that includes (732) an NFC antenna (e.g., antenna 216, FIG. 2), a matching network (e.g., matching network 214, FIG. 2) coupled to the NFC antenna, and a transmitter (e.g., transmitter 212, FIG. 2) coupled to the matching network. Performing the method 730 may include performing the method 700 (FIG. 7A) but further includes calibration of the NFC device to improve accuracy. In some embodiments, a non-transitory computer-readable medium (e.g., one or more non-volatile memory devices) in the memory 210 of the NFC controller 206 (FIG. 2) includes instructions that, when executed by the processor(s) 208, cause the NFC device 200 to perform the method 730.

In the method 730, an output impedance of the transmitter (e.g., $R_{tx}$ 614-1 and 614-2, FIG. 6) is configured (734) to have a first value. The output impedance is configured, for example, by selectively enabling and disabling parallel transistors in the transmitter (e.g., in response to control signals from the NFC controller 206, FIG. 2). With the transmitter output impedance configured to have the first value, a signal (e.g., the signal 306, FIGS. 3A-3B) is applied from the transmitter to the matching network, the capacitance of the matching network is varied, and a first series of measurements of a parameter (e.g., current, voltage, or power) is performed (736). A first peak value of the parameter is identified (738) from the first series. In some embodiments, the operations 736 and 738 are an example of the operations 704, 706, and 708 of the method 700 (FIG. 7A) and are performed accordingly.

The output impedance of the transmitter is configured (740) to have a second value. With the transmitter output impedance configured to have the second value, the signal is applied from the transmitter to the matching network, the capacitance of the matching network is varied, and a second series of measurements of the parameter is performed (742). A second peak value of the parameter is identified (744) from the second series.

The transmitter and the antenna are calibrated (746) based at least in part on the first and second peak parameter values. In some embodiments, peak values of one or more additional parameters are measured and identified and the calibration is further based on these additional peak values. For example, the calibration may be based on both first and second peak current values and first and second peak voltage values. The calibration may account for variations in resistance or impedance resulting from manufacturing and/or operating conditions.

In some embodiments, calibrating (746) the transmitter and antenna includes determining a threshold (e.g., threshold 410, FIG. 4) based at least in part on the first and second peak parameter values. In some embodiments, calibrating (746) the transmitter and antenna includes determining the output impedance of the transmitter and a resistance of the antenna based at least in part on the first and second peak parameter values, and determining the threshold based on the determined output impedance of the transmitter and resistance of the antenna.

A determination is made (748) as to whether one of the peak parameter values satisfies the threshold (or alternatively, whether peak values of multiple parameters satisfy respective thresholds). The operation 748 may be an example of the operation 710 (FIG. 7A).

If the peak parameter value is determined to satisfy the threshold (748-Yes), a communication protocol (e.g., a polling procedure) is initiated (750) in response to the determination. The operation 750 may be an example of the operation 712 (FIG. 7A).

In some embodiments, if the peak parameter value does not satisfy the threshold (748-No), the operations 734-746 are repeated (e.g., after a specified period of time, in a periodic manner). Alternatively, after the transmitter and antenna are calibrated once, their calibration is not repeated; instead, the method 700 (FIG. 7A) is subsequently performed in response to a determination that the peak parameter value does not satisfy the threshold (748-No).

The method 730 thus allows a communication protocol (including, for example, a polling procedure) to be initiated based on parameter measurements, and performs calibration to ensure a high accuracy for determining whether to initiate the communication protocol. The method 730, like the method 700 (FIG. 7A), saves power and extends battery life for battery-powered NFC devices that perform the method.

While the method 730 includes a number of operations that appear to occur in a specific order, it should be apparent that the method 730 can include more or fewer operations, which can be executed serially or in parallel. An order of two or more operations may be changed and two or more operations may be combined into a single operation.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method of operating a first near-field communications (NFC) device comprising an NFC antenna, a matching network coupled to the NFC antenna, and a transmitter coupled to the matching network, the method comprising:
    applying a signal from the transmitter to the matching network;
    varying a capacitance of the matching network;
    measuring a parameter while varying the capacitance of the matching network and applying the signal;
    identifying a first peak value of the parameter;
    detecting a second NFC device, the detecting comprising comparing the first peak value to a threshold and determining that the first peak value satisfies the threshold; and
    initiating a communication protocol in response to detecting the second NFC device.

2. The method of claim 1, wherein the parameter comprises a current consumed while varying the capacitance of the matching network and applying the signal.

3. The method of claim 1, wherein the parameter comprises a voltage measured across the NFC antenna while varying the capacitance of the matching network and applying the signal.

4. The method of claim 1, wherein:
    measuring the parameter comprises performing a first series of measurements and a second series of measurements;
    the first peak value is identified from the first series of measurements; and
    the method further comprises:
        configuring an output impedance of the transmitter to have a first value while performing the first series of measurements;
        configuring the output impedance of the transmitter to have a second value while performing the second series of measurements;
        identifying a second peak value of the parameter from the second series of measurements; and
        calibrating the transmitter and the antenna based at least in part on the first and second peak values of the parameter, wherein the comparing is performed in accordance with the calibrating.

5. The method of claim 4, wherein the calibrating comprises determining the output impedance of the transmitter and a resistance of the antenna based at least in part on the first and second peak values of the parameter.

6. The method of claim 5, wherein the calibrating further comprises determining the threshold based on the determined output impedance of the transmitter and resistance of the antenna.

7. The method of claim 4, wherein the calibrating comprises determining the threshold based at least in part on the first and second peak values of the parameter.

8. The method of claim 1, wherein the signal comprises an oscillating signal.

9. The method of claim 1, wherein varying the capacitance of the matching network comprises sweeping the capacitance across a range of values.

10. The method of claim 1, wherein:
the matching network comprises a variable capacitor; and
varying the capacitance of the matching network comprises varying a capacitance of the variable capacitor.

11. The method of claim 10, wherein the variable capacitor is situated in series with the NFC antenna.

12. The method of claim 10, wherein the variable capacitor is situated in parallel with the NFC antenna.

13. The method of claim 1, wherein:
the matching network comprises a capacitor and a switch situated in series between a node of the matching network and ground; and
varying the capacitance of the matching network comprises selectively opening and closing the switch.

14. The method of claim 1, wherein initiating the communication protocol comprises initiating a polling procedure.

15. A first near-field communications (NFC) device, comprising:
an NFC antenna;
a matching network coupled to the NFC antenna and having a variable capacitance;
a transmitter, coupled to the matching network, to provide a signal to the matching network;
one or more processors; and
memory storing one or more programs configured to be executed by the one or more processors, the one or more programs comprising:
instructions to vary the capacitance of the matching network;
instructions to measure a parameter while varying the capacitance of the matching network and while the transmitter provides the signal to the matching network;
instructions to identify a first peak value of the parameter;
instructions to detect a second NFC device, comprising instructions to compare the first peak value to a threshold; and
instructions to initiate a communication protocol in response to detecting the second NFC device.

16. The NFC device of claim 15, wherein:
the instructions to measure the parameter comprise instructions to perform a first series of measurements and a second series of measurements;
the instructions to identify the first peak value comprise instructions to identify the first peak value from the first series of measurements; and
the one or more programs further comprise:
instructions to configure an output impedance of the transmitter to have a first value or a second value, wherein the output impedance of the transmitter is to have the first value while performing the first series of measurements and the second value while performing the second series of measurements;
instructions to identify a second peak value of the parameter from the second series of measurements; and
instructions to calibrate the transmitter and the antenna based at least in part on the first and second peak values.

17. The NFC device of claim 16, wherein the instructions to calibrate the transmitter and the antenna comprise instructions to determine the output impedance of the transmitter and a resistance of the antenna based at least in part on the first and second peak values.

18. The NFC device of claim 17, wherein the instructions to calibrate the transmitter and the antenna further comprise instructions to determine the threshold based on the determined output impedance of the transmitter and the resistance of the antenna.

19. The NFC device of claim 16, wherein the instructions to calibrate the transmitter and the antenna comprise instructions to determine the threshold based at least in part on the first and second peak values.

20. The NFC device of claim 15, wherein:
the matching network comprises a variable capacitor; and
the instructions to vary the capacitance of the matching network comprise instructions to vary a capacitance of the variable capacitor.

21. A first near-field communications (NFC) device, comprising:
an NFC antenna;
a matching network coupled to the NFC antenna;
a transmitter, coupled to the matching network, to provide a signal to the matching network;
means for varying a capacitance of the matching network;
means for detecting a second NFC device based on a peak value of a parameter measured while varying the capacitance of the matching network and while the transmitter provides the signal to the matching network; and
means for initiating a communication protocol in response to detecting the second NFC device.

* * * * *